(12) United States Patent
Yamakawa

(10) Patent No.: US 11,498,412 B2
(45) Date of Patent: Nov. 15, 2022

(54) VEHICLE UNDERBODY COVER STRUCTURE

(71) Applicant: TOYOTA JIDOSHA KABUSHIKI KAISHA, Toyota (JP)

(72) Inventor: Eitaro Yamakawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/473,249

(22) Filed: Sep. 13, 2021

(65) Prior Publication Data

US 2022/0185098 A1  Jun. 16, 2022

(30) Foreign Application Priority Data

Dec. 11, 2020  (JP) ............................. JP2020-205617

(51) Int. Cl.
| | |
|---|---|
| *B60K 11/08* | (2006.01) |
| *B62D 25/20* | (2006.01) |
| *B60K 11/06* | (2006.01) |
| *B62D 25/16* | (2006.01) |
| *B62D 21/15* | (2006.01) |

(52) U.S. Cl.
CPC .............. *B60K 11/06* (2013.01); *B60K 11/08* (2013.01); *B62D 25/16* (2013.01); *B62D 25/20* (2013.01); *B62D 21/155* (2013.01)

(58) Field of Classification Search
CPC ......... B60K 11/06; B60K 11/00; B60K 11/08; B62D 25/16; B62D 25/20; B62D 25/2009; B62D 25/2018; B62D 25/2063; B62D 25/2072; B62D 35/02; B62D 21/155

See application file for complete search history.

(56) References Cited

U.S. PATENT DOCUMENTS

| | | | |
|---|---|---|---|
| 2016/0361991 A1* | 12/2016 | Phan | B62D 35/02 |
| 2018/0093562 A1* | 4/2018 | Murata | F01N 3/10 |
| 2019/0072023 A1* | 3/2019 | Kinomoto | B60K 11/08 |
| 2021/0284247 A1* | 9/2021 | Dobrozdravic | B62D 25/2072 |

FOREIGN PATENT DOCUMENTS

JP  2020-100290 A  7/2020

\* cited by examiner

*Primary Examiner* — Jacob M Amick
(74) *Attorney, Agent, or Firm* — Dinsmore & Shohl LLP

(57) ABSTRACT

A vehicle underbody cover structure includes: a first splash shield placed below a cooling object and having a service hole; and a service lid detachably attached to the first splash shield such that the service lid covers the service hole. The service lid includes a lid-side vertical wall standing in the up-down direction, the lid-side vertical wall being placed ahead of the cooling object in the vehicle front-rear direction. The lid-side vertical wall has an air-cooling hole provided in a penetrating manner in the vehicle front-rear direction such that travel wind passes through the air-cooling hole, the air-cooling hole being provided to at least partially overlap with the cooling object in the vehicle width direction.

6 Claims, 5 Drawing Sheets

VEHICLE UNDERBODY COVER STRUCTURE

CROSS-REFERENCE TO RELATED APPLICATION

This application claims priority to Japanese Patent Application No. 2020-205617 filed on Dec. 11, 2020, incorporated herein by reference in its entirety.

BACKGROUND

1. Technical Field

The present specification describes a vehicle underbody cover structure including a first splash shield having a serving hole, and a service lid covering the service hole.

2. Description of Related Art

Generally, vehicles are provided with a component generating heat along with driving. The component is an engine, a motor, or the like. Such a heat generation component is a cooling object to be cooled when the heat generation component is driven. A splash shield is provided below the cooling object, so that the splash shield separates a mounting space for the cooling object from outside. For example, in Japanese Unexamined Patent Application Publication No. 2020-100290 (JP 2020-100290 A), a power unit (e.g., an engine, a motor, or the like) as a cooling object is provided in a power unit chamber set in a front portion of a vehicle. In JP 2020-100290 A, a bottom portion of the power unit chamber is constituted by a splash shield.

SUMMARY

As described above, such a cooling object is cooled when the cooling object is driven. In the related art, at the time when a power source such as an engine or a motor is cooled, refrigerant is used, and travel wind is used to cool the refrigerant. That is, heat of the refrigerant exchanging heat with the power source is dissipated by a radiator, and the radiator is cooled by the travel wind flowing therein through a front grille. However, the cooling object might not be cooled sufficiently only by cooling the refrigerant by wind passing through the grill. Particularly, in recent years, power sources have been downsized and have achieved high output, so that their heat capacities are reduced. In the meantime, the heat generation amounts of the power sources have increased. In view of this, it has been demanded to more efficiently cool the power sources.

Note that the splash shield described in JP 2020-100290 A has an opening through which the power unit chamber is accessible from outside the vehicle at the time of maintenance. However, the opening is closed by a service lid while the maintenance is not executed. On this account, it is difficult to send the travel wind to the cooling object through the opening in JP 2020-100290 A. Accordingly, even in the structure described in JP 2020-100290 A, the cooling object cannot be cooled sufficiently in some cases.

In view of this, the present specification describes a vehicle underbody cover structure that can more efficiently cool a cooling object.

A vehicle underbody cover structure described in the present specification includes a first splash shield and a service lid. The first splash shield is placed under a cooling object and has a service hole. The service lid is detachably attached to the first splash shield such that the service lid covers the service hole. The service lid includes a lid-side vertical wall standing in the up-down direction, the lid-side vertical wall being placed ahead of the cooling object in the vehicle front-rear direction. The lid-side vertical wall has an air-cooling hole provided in a penetrating manner in the vehicle front-rear direction such that travel wind passes through the air-cooling hole, the air-cooling hole being provided to at least partially overlap with the cooling object in the vehicle width direction.

In such a configuration, the travel wind can reach the cooling object through the air-cooling hole. As a result, it is possible to efficiently cool the cooling object.

In this case, a part of the first splash shield, the part being from a front edge of the first splash shield to a front edge of the service hole, may swell upward from a rear edge of the service hole such that a tunnel is formed in a penetrating manner in the vehicle front-rear direction from the front edge of the first splash shield to the front edge of the service hole.

With such a configuration, the travel wind can reach the cooling object through the tunnel and the air-cooling hole.

Further, a part of the service lid, the part being placed behind the lid-side vertical wall, includes an inclined portion inclined downward toward its front side such that the lid-side vertical wall is placed below a peripheral edge of the service hole.

With such a configuration, the travel wind can reach the cooling object while the first splash shield has a generally flat shape without swelling.

Further, the service hole may have a generally trapezoidal shape in a plan view such that a front end of the service hole is wider than a rear end of the service hole.

With such a configuration, a large area can be secured for the air-cooling hole while the area of the whole service hole is restrained to be small.

Further, the service lid may have a thickness larger than a thickness of the first splash shield.

Hereby, it is possible to maintain high strength of the service lid in which the air-cooling hole is formed.

Further, the vehicle underbody cover structure may further include a second splash shield placed ahead of the first splash shield and provided such that a rear end of the second splash shield is connected to a front end of the first splash shield. The second splash shield may include a part placed below an upper end of the air-cooling hole in a range where the second splash shield overlaps with the air-cooling hole in the vehicle width direction.

With such a configuration, it is possible to effectively prevent foreign matter on a road surface from entering inside the vehicle through the air-cooling hole.

With the vehicle underbody cover structure described in the present specification, the travel wind can reach the cooling object through the air-cooling hole, thereby making it possible to efficiently cool the cooling object.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
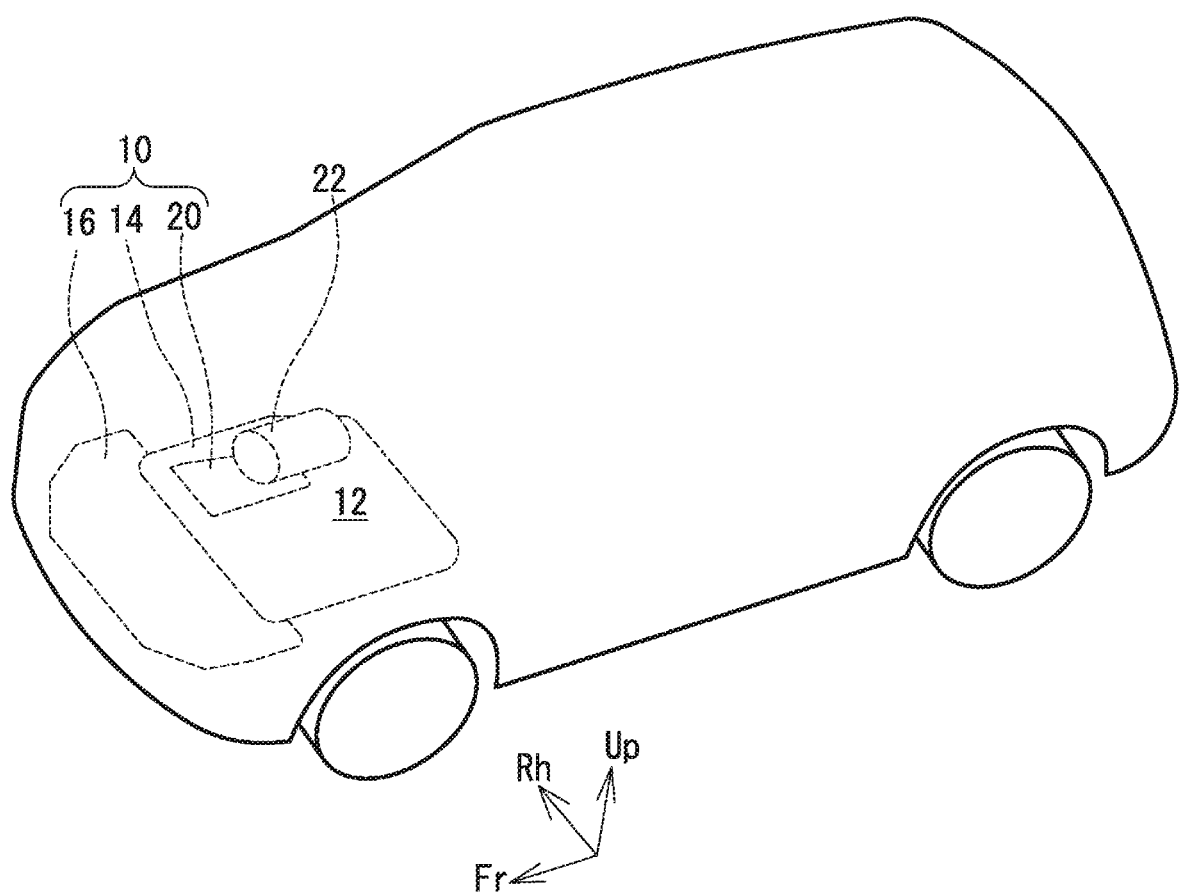
FIG. 1 is a view to describe the position of a vehicle underbody cover structure inside a vehicle.
Figure 2:
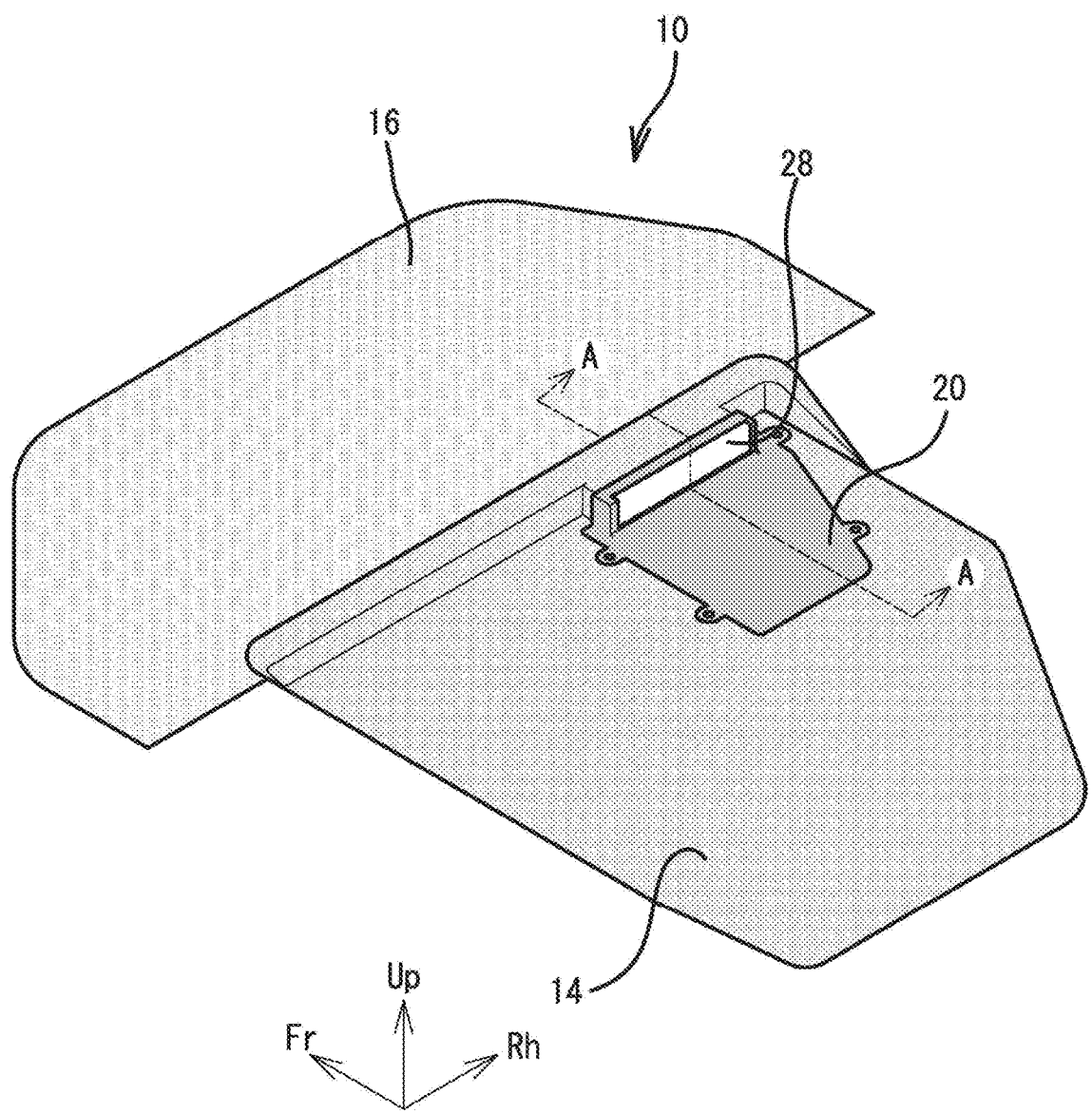
FIG. 2 is a perspective view of the vehicle underbody cover structure.
Figure 3:
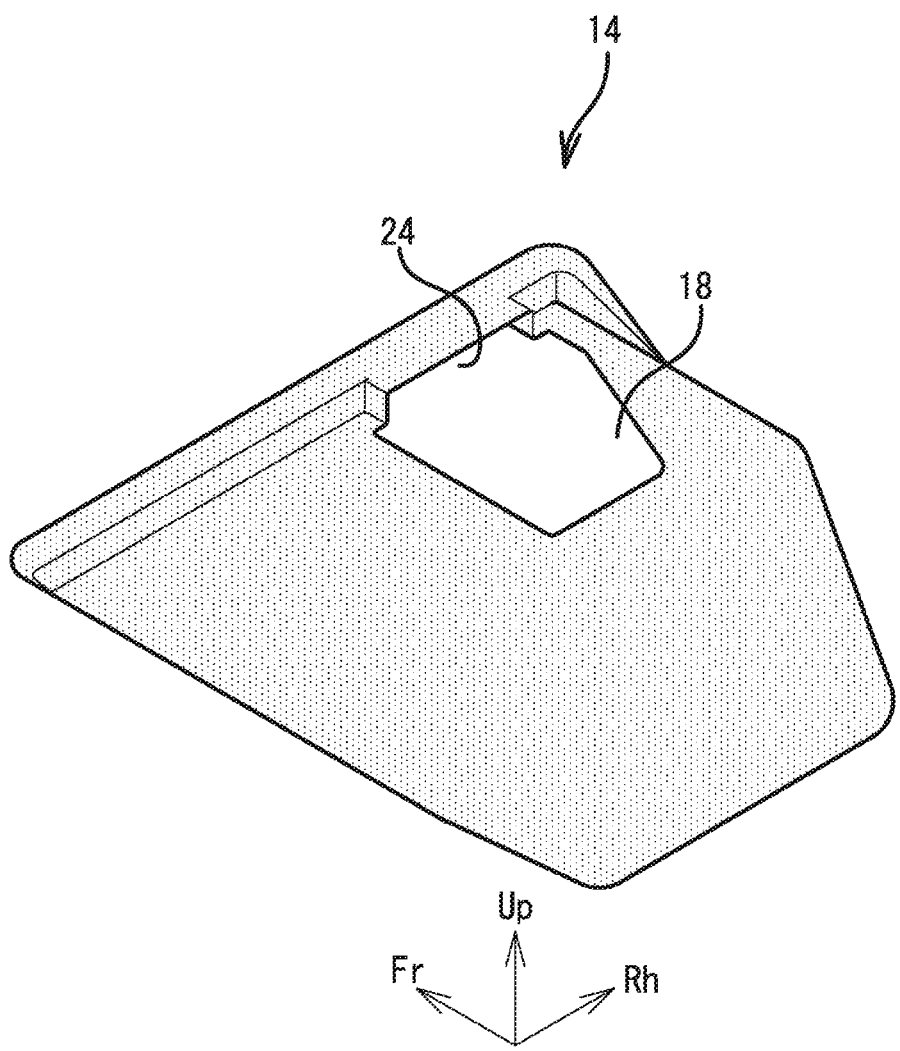
FIG. 3 is a perspective view of a first splash shield.
Figure 4:
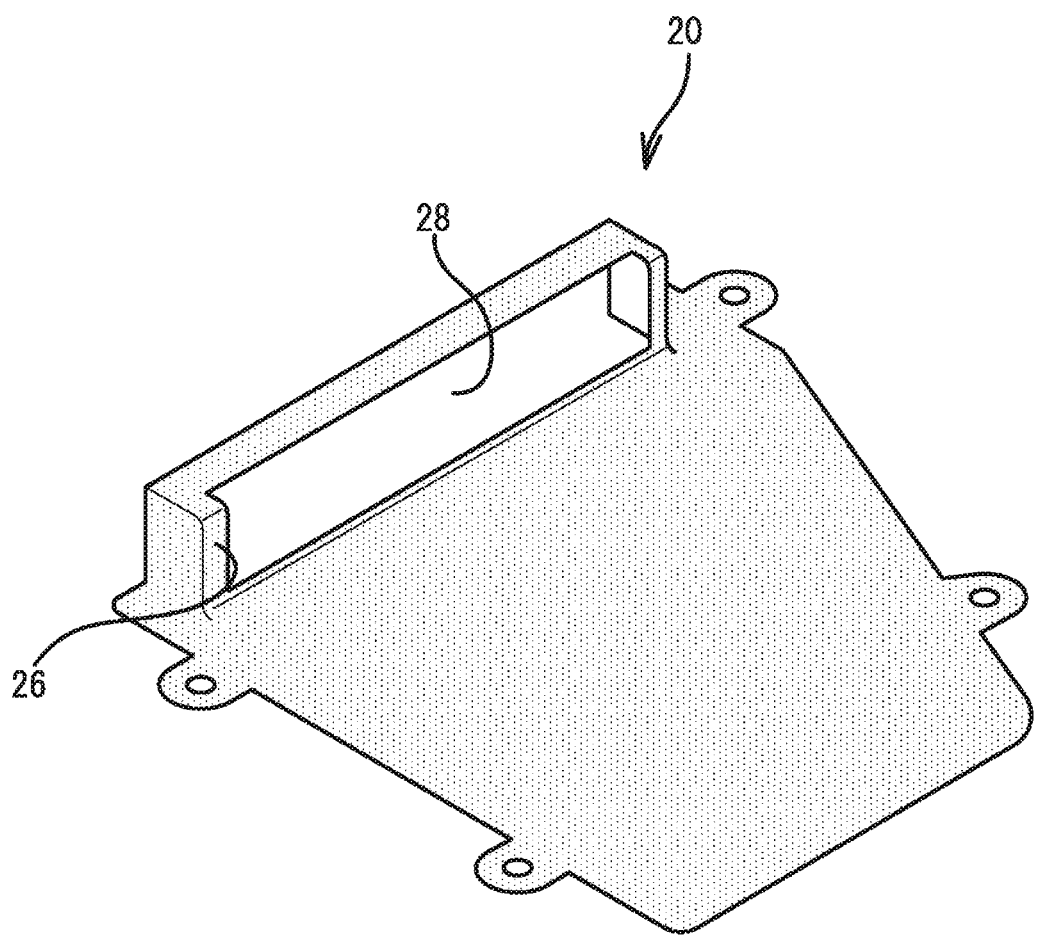
FIG. 4 is a perspective view of a service lid.
Figure 5:
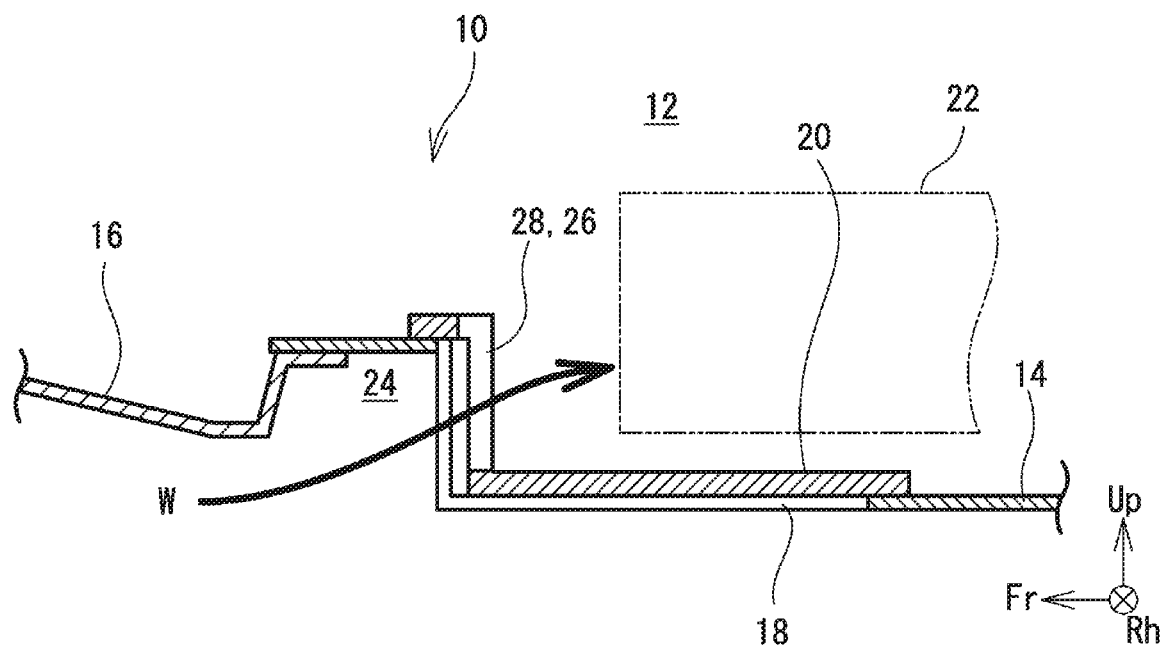
FIG. 5 is a sectional view taken along a line A-A in FIG. 2.

With reference to the drawings, the following describes a vehicle underbody cover structure 10. FIG. 1 is a view to describe the position of the vehicle underbody cover structure 10 inside a vehicle, and FIG. 2 is a perspective view of the vehicle underbody cover structure 10. Further, FIG. 3 is a perspective view of a first splash shield 14, and FIG. 4 is a perspective view of a service lid 20. Further, FIG. 5 is a sectional view taken along a line A-A in FIG. 2. Note that "Fr," "Up," and "Rh" in each figure indicate the front side in the vehicle front-rear direction, the upper side in the vehicle up-down direction, and the right side in the vehicle right-left direction, respectively.

A power unit chamber 12 is provided in a front portion of the vehicle such that the power unit chamber 12 is disposed under a hood. A power source such as an engine or a drive motor is placed in the power unit chamber 12. The power source generates heat along with driving of the power source, and therefore, the power source is a cooling object 22 that is necessary to be cooled. Such a power source is cooled by use of refrigerant in general. The refrigerant cools the power source by exchanging heat with the power source. The refrigerant passing through the power source is cooled by exchanging heat with an external air in a radiator (not illustrated) provided in the power unit chamber 12, and then, the refrigerant is sent to the power source again. In order to efficiently cool the refrigerant, a grille (not illustrated) that is an opening to send travel wind to the radiator is formed in a front end of the vehicle.

Further, in a lower part of the power unit chamber 12, the vehicle underbody cover structure 10 functioning as a floor face of the power unit chamber 12 is provided. The vehicle underbody cover structure 10 includes a first splash shield 14, a second splash shield 16, and a service lid 20. The first splash shield 14 and the second splash shield 16 are panel-shaped members manufactured by performing press molding on metal. As illustrated in FIGS. 1, 2, the second splash shield 16 is placed in front of the first splash shield 14, and a rear end of the second splash shield 16 is connected to a front end of the first splash shield 14.

As illustrated in FIG. 3, the first splash shield 14 has an opening called a service hole 18. The service hole 18 is an opening through which an operator accesses the inside of the power unit chamber 12 from below and outside the vehicle at the time of maintenance or the like. Accordingly, the service hole 18 has at least a magnitude that allows the arm of a person to insert into the service hole 18.

Here, as illustrated in FIG. 3, a part from a front edge of the first splash shield 14 to a front edge of the service hole 18 swells upward from a rear edge of the service hole 18. As a result, a tunnel 24 is formed such that the tunnel 24 penetrates in the front-rear direction from the front edge of the first splash shield 14 to the front edge of the service hole 18. As illustrated in FIG. 5, the tunnel 24 functions as a passage that guides travel wind W to the cooling object 22, but, this will be described later. The cooling object 22 such as an engine is attached to a position where the cooling object 22 is accessible from the service hole 18.

The service hole 18 is opened at the time of maintenance, but in other scenes, the service hole 18 is covered by the service lid 20. The service lid 20 is a panel-shaped component having an outer shape that is one size larger than the service hole 18. The service lid 20 can be manufactured by performing press molding on a metal plate, for example. The service lid 20 is attached to the first splash shield 14 by a fixture, e.g., a screw and a speed nut, or the like such that the service lid 20 is attachable and detachable from outside the vehicle.

Here, as illustrated in FIG. 4, a front end of the service lid 20 rises upward similarly to the front end of the first splash shield 14, so that a lid-side vertical wall 26 is formed. An air-cooling hole 28 is formed in the lid-side vertical wall 26. The air-cooling hole 28 is an opening having a generally rectangular shape elongated in the vehicle width direction. A shape and a size of the air-cooling hole 28 are not limited particularly, but as the air-cooling hole 28 is larger, higher cooling efficiency is achieved. Accordingly, in the present embodiment, the air-cooling hole 28 has a magnitude that occupies a large part of the lid-side vertical wall 26. The air-cooling hole 28 is set to a position and a size that allow the air-cooling hole 28 to communicate with the tunnel 24 at the time when the service lid 20 is attached to the first splash shield 14. The air-cooling hole 28 is provided to efficiently cool the cooling object 22 such as the engine. The following describes this more specifically.

As described above, the cooling object 22 such as a power source is placed in the power unit chamber 12. The cooling object 22 is cooled by refrigerant in general. However, in recent years, power sources have been downsized and have achieved high output, so that the heat capacities of the power sources are reduced. In the meantime, the heat generation amounts of the power sources have increased, so that the power sources might excessively increase in temperature. In view of this, a technology to more efficiently cool a cooling object such as a power source is demanded.

In the present embodiment, in order to satisfy such a demand, the lid-side vertical wall 26 is provided in the service lid 20, and the air-cooling hole 28 is formed in the lid-side vertical wall 26, as described above. With such a configuration, as illustrated in FIG. 5, the travel wind W reaches the cooling object 22 through the air-cooling hole 28, so that the travel wind W takes heat away from the cooling object 22. Hereby, the cooling object 22 can be cooled more efficiently. Here, in order to enable the cooling by the travel wind W, the air-cooling hole 28 (eventually, the lid-side vertical wall 26) is placed ahead of the cooling object 22, and further, the air-cooling hole 28 at least partially overlaps with the cooling object 22 in the vehicle width direction. In such an arrangement, the travel wind W passing through the air-cooling hole 28 can more surely reach the cooling object 22.

In the meantime, to increase the area of the cooling hole 28 is effective to improve cooling efficiency by the air-cooling hole 28. Meanwhile, when the service hole 18 is made large to secure the large air-cooling hole 28, another problem is caused such as a decrease in strength of the first splash shield 14. In view of this, in the present embodiment, the service hole 18 is formed generally in a trapezoidal shape in a plan view such that its front end is wider than its rear end. With such a configuration, while the dimension of the front end of the service hole 18 in the vehicle width direction is kept large, the area of the service hole 18 can be restrained to be small. As a result, it is possible to restrain the decrease in strength of the first splash shield 14 while the air-cooling hole 28 with a large area is secured.

Here, during traveling of the vehicle, the travel wind W blows into the air-cooling hole 28, so that a load is easily caused around the air-cooling hole 28 due to wind pressure. In order to endure such a load, the thickness of the service lid 20 is made larger than the thickness of the first splash shield 14 in the present embodiment. Note that the area of the service lid 20 is smaller than the area of the first splash shield 14. Accordingly, even when the thickness of the service lid 20 is made large, an influence to increases in cost and weight is small.

In the meantime, it is also conceivable that the air-cooling hole 28 is provided at a position, in the first splash shield 14, that is distanced from the service hole 18 instead of providing the air-cooling hole 28 in the service lid 20. Even in this case, the travel wind W flows into the power unit chamber 12 through the air-cooling hole 28. When the cooling object 22 is placed on the downstream side in the passage of the travel wind W, it is possible to efficiently cool the cooling object 22. However, in this case, in order to endure the wind pressure, it is necessary to increase the thickness of the whole first splash shield 14 with a large area, thereby resulting in that the cost and the weight largely increase. In the meantime, in the present embodiment, the air-cooling hole 28 is provided in the service lid 20 instead of providing the air-cooling hole 28 in the first splash shield 14. Accordingly, in order to obtain necessary strength, the thickness of the service lid 20 is just increased, and it is not necessary to increase the thickness of the first splash shield 14. As a result, it is possible to restrain the increases in cost and weight.

Here, as apparent from the description made so far, the air-cooling hole 28 is open during traveling of the vehicle, and the inside of the vehicle communicates with the outside of the vehicle via the air-cooling hole 28. On this account, foreign matter on a road, e.g., snow or the like, may enter the power unit chamber 12 via the air-cooling hole 28. In order to prevent the foreign matter from entering the power unit chamber 12, a part, of the second splash shield 16, that is placed below an upper end of the air-cooling hole 28 is provided in a range where the second splash shield 16 overlaps with the air-cooling hole 28 in the vehicle width direction. In the present embodiment, as illustrated in FIG. 5, the whole second splash shield 16 is inclined downward toward the rear side such that the rear end of the second splash shield 16 is placed below the upper end of the air-cooling hole 28. With such a configuration, the foreign matter such as snow makes contact with the rear end of the second splash shield 16 and moves before the foreign matter reaches the air-cooling hole 28. As a result, it is possible to largely reduce the foreign matter to enter inside the vehicle through the air-cooling hole 28.

Figure 6:
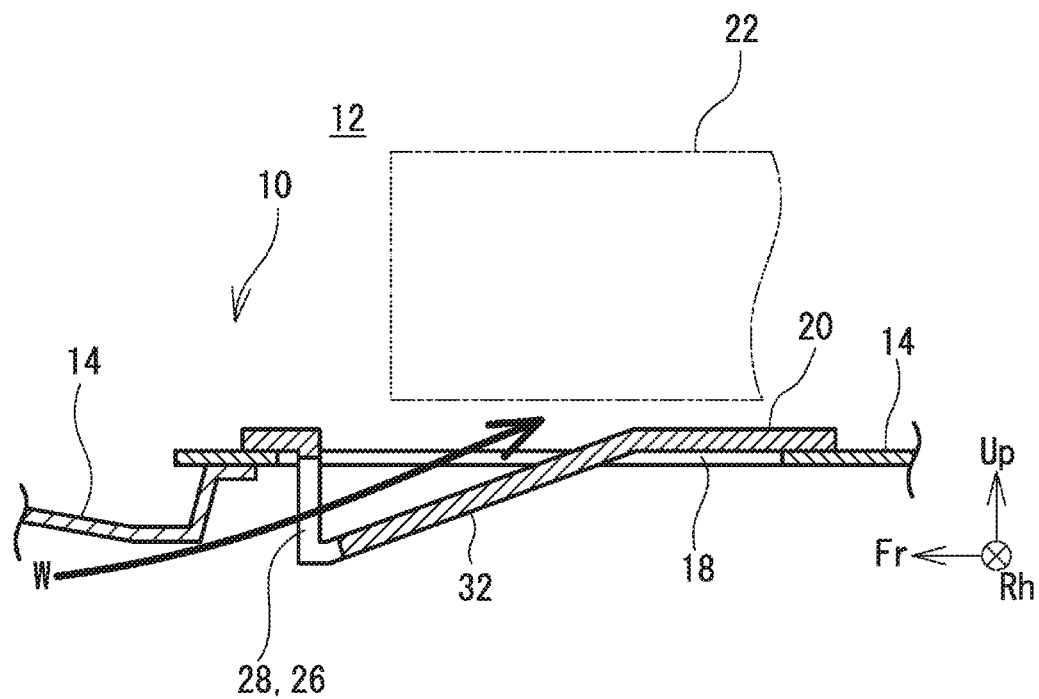
FIG. 6 is a sectional view of another vehicle underbody cover structure.

Note that the configuration described herein is an example. The service lid 20 should be provided with the lid-side vertical wall 26 placed ahead of the cooling object 22 in the vehicle front-rear direction, and the lid-side vertical wall 26 should have the air-cooling hole 28 formed to at least partially overlap with the cooling object 22 in the vehicle width direction, but other configurations may be changed. For example, in the description made so far, the first splash shield 14 partially swells upward to provide the tunnel 24. However, the first splash shield 14 may have a generally flat shape without swelling. In this case, in order that the air-cooling hole 28 communicates with the outside of the vehicle, a part of the service lid 20, the part being placed behind the lid-side vertical wall 26, may include an inclined portion 32 inclined downward toward the front side, as illustrated in FIG. 6. With such a configuration, the service lid 20 is placed below a peripheral edge of the service hole 18, so that the air-cooling hole 28 can communicate with the outside of the vehicle. As a result, the travel wind W can flow into the power unit chamber 12 through the air-cooling hole 28, thereby making it possible to efficiently cool the cooling object 22.

Further, the thickness of the service lid 20 may be the same as or smaller than the thickness of the first splash shield 14, provided that the service lid 20 can sufficiently endure the wind pressure. Further, the cooling object 22 is not limited to a power source, provided that the cooling object 22 requires cooling by travel wind, and the cooling object 22 may be other heat generation devices such as a battery, for example. Further, in the present embodiment, the first splash shield 14 is the floor face of the power unit chamber 12. However, the first splash shield 14 may be used as floor faces for other spaces, provided that the cooling object 22 is placed in the spaces.

What is claimed is:

1. A vehicle underbody cover structure comprising:
   a first splash shield placed under a cooling object and having a service hole; and
   a service lid detachably attached to the first splash shield such that the service lid covers the service hole, wherein:
   the service lid includes a lid-side vertical wall standing in an up-down direction, the lid-side vertical wall being placed ahead of the cooling object in a vehicle front-rear direction; and
   the lid-side vertical wall has an air-cooling hole provided in a penetrating manner in the vehicle front-rear direction such that travel wind passes through the air-cooling hole, the air-cooling hole being provided to at least partially overlap with the cooling object in a vehicle width direction.

2. The vehicle underbody cover structure according to claim 1, wherein a part of the first splash shield, the part being from a front edge of the first splash shield to a front edge of the service hole, swells upward from a rear edge of the service hole such that a tunnel is formed in a penetrating manner in the vehicle front-rear direction from the front edge of the first splash shield to the front edge of the service hole.

3. The vehicle underbody cover structure according to claim 1, wherein a part of the service lid, the part being placed behind the lid-side vertical wall, includes an inclined portion inclined downward toward a front side such that the lid-side vertical wall is placed below a peripheral edge of the service hole.

4. The vehicle underbody cover structure according to claim 1, wherein the service hole has a generally trapezoidal shape in a plan view such that a front end of the service hole is wider than a rear end of the service hole.

5. The vehicle underbody cover structure according to claim 1, wherein the service lid has a thickness larger than a thickness of the first splash shield.

6. The vehicle underbody cover structure according to claim 1, further comprising a second splash shield placed ahead of the first splash shield and provided such that a rear end of the second splash shield is connected to a front end of the first splash shield, wherein the second splash shield includes a part placed below an upper end of the air-cooling hole in a range where the second splash shield overlaps with the air-cooling hole in the vehicle width direction.

* * * * *